United States Patent
McKinzie, III

(10) Patent No.: US 7,869,187 B2
(45) Date of Patent: Jan. 11, 2011

(54) ACOUSTIC BANDGAP STRUCTURES ADAPTED TO SUPPRESS PARASITIC RESONANCES IN TUNABLE FERROELECTRIC CAPACITORS AND METHOD OF OPERATION AND FABRICATION THEREFORE

(75) Inventor: William E. McKinzie, III, Fulton, MD (US)

(73) Assignee: Paratek Microwave, Inc., Nashua, NH (US)

( * ) Notice: Subject to any disclaimer, the term of this patent is extended or adjusted under 35 U.S.C. 154(b) by 281 days.

(21) Appl. No.: 11/899,062

(22) Filed: Sep. 4, 2007

(65) Prior Publication Data

US 2009/0059464 A1 Mar. 5, 2009

(51) Int. Cl.
*H01G 4/005* (2006.01)
*H01G 4/06* (2006.01)
(52) U.S. Cl. ........................................ 361/303; 361/311
(58) Field of Classification Search ................. 361/311, 361/321.1, 321.2, 303
See application file for complete search history.

(56) References Cited

U.S. PATENT DOCUMENTS

| 4,240,003 | A | 12/1980 | Larson, III | 310/326 |
| 6,437,484 | B1 | 8/2002 | Nishimura et al. | 310/324 |
| 2004/0184217 | A1* | 9/2004 | List et al. | 361/306.2 |
| 2006/0274476 | A1 | 12/2006 | Cervin-Lawry et al. | |
| 2008/0253056 | A1* | 10/2008 | Leidl et al. | 361/281 |

FOREIGN PATENT DOCUMENTS

WO WO 2007031061 A1 * 3/2007

* cited by examiner

*Primary Examiner*—Eric Thomas
(74) *Attorney, Agent, or Firm*—Ed Guntin; Guntin Meles & Gust

(57) ABSTRACT

An acoustic bandgap structure can include a stack of at least three ferroelectric layers with a top side and bottom side of each of the ferroelectric layers contacting an electrode layer, where the ferroelectric layers and the electrode layers form a substantially periodic structure in the direction normal to the ferroelectric and electrode layers and where an acoustic characteristic impedance and thickness of each layer are selected to realize an acoustic bandgap over a desired frequency band for the purpose of improving the device Q.

16 Claims, 18 Drawing Sheets

ACOUSTIC BANDGAP STRUCTURES ADAPTED TO SUPPRESS PARASITIC RESONANCES IN TUNABLE FERROELECTRIC CAPACITORS AND METHOD OF OPERATION AND FABRICATION THEREFORE

BACKGROUND

Tunable thin film ferroelectric capacitors may be fabricated on conventional sapphire or alumina substrates using films of BST, BSTO, SrTiO, etc. Such films are tunable because their normal component of dielectric constant can be reduced with an applied electric field. However, these films are also electrostrictive, meaning that the thickness of the thin films is also changed as a function of applied electric field. When an RF electric field is applied across an electrostrictive film, a force or stress appears in the film. This stress causes a strain or motion in the molecules of the film. Bulk acoustic waves in the form of longitudinal waves are generated within that film layer in the direction normal to the interfaces. Hence electric energy is transformed into acoustic energy. This phenomenon is well known to designers of microwave acoustic resonators. See for example the tutorial paper by Weigel et. al. (IEEE Trans. on Microwave Theory and Techniques, Vol. 50, No. 3, March 2002. pp. 738-749.)

Ferroelectric thin film capacitors are often fabricated in the vertical dimension as a dielectric film sandwiched between a pair of metal electrodes which are typically platinum. As an acoustic resonator, this three layer structure will resonate near frequencies where the acoustic length (in the z axis) is one-half of a guide wavelength plus odd multiples of half guide wavelengths. Coupling to other metal and oxide layers will perturb the resonant frequencies. Since the dielectric and electrode thickness are typically less than one micron total, the acoustic resonances are typically found in the 1 GHz to 10 GHz range.

Acoustic resonances are manifested at the electrical terminals of the tunable capacitor by a frequency selective drop (null) in device Q, or as a frequency selective rise (peak) in excess series resistance (ESR). Acoustic resonances are damped by material losses in the metal and oxide layers. They are also damped by acoustic radiation loss into the substrate. Both loss mechanisms will reduce the height of the ESR peak, but they will deleteriously broaden the peak or the frequency range over which ESR is increased. For this reason it is desirable to limit the acoustic loss mechanisms and hence limit the frequency range over which ESR exceeds some maximum accepted value. One means of reducing the acoustic losses is to fabricate an acoustic reflector, or acoustic mirror, between the ferroelectric film and the substrate. Acoustic mirrors may be fabricated by depositing alternating layers of low and high acoustic impedance materials in a periodic structure. The acoustic characteristic impedance of a material layer is the product of its mass density, its longitudinal sound velocity, and its planar area. Acoustic mirrors are often fabricated using alternating metal/oxide layers due to the large contrast in densities, but metal/metal or oxide/oxide layers may also be used.

Acoustic mirrors, or Bragg mirrors as they are sometimes called, are commonly used in miniature microwave filters manufactured as SMR (solidly mounted resonators) to isolate the resonators from the substrate. See for example (1) Marc-Alexandre Dubois, "Thin Film Bulk Acoustic Wave Resonators: A Technology Overview," MEMSWAVE 03, Toulouse, France, Jul. 2-4, 2003, and (2) Schmidhammer et. al. "Design Flow and Methodology on the Design of BAW components," 2005 IEEE Intl. Microwave Symposium, paper TU3D-7. A SMR is a bulk acoustic wave resonator fabricated on a Bragg mirror, composed of quarter-wavelength thick layers of alternatively high and low acoustic impedance materials. The effect of these layers is to achieve nearly total reflection of the acoustic waves at the bottom of the resonator. The goal is to eliminate acoustic radiation losses into the substrate and hence improve resonator Q and the filter insertion loss.

Acoustic resonances have recently been recognized as an issue in the design of tunable ferroelectric capacitors since they result in degradation of device Q at microwave frequencies. In the publication of a recent US patent application (2006/0274476) Cervin-Lawry et. al. assert that the use of acoustic mirrors placed below (FIG. 6) or above (FIG. 8) a thin film tunable capacitor will "modify the acoustic properties of the capacitor structure such that the polar capacitor absorbs RF energy at a frequency that is outside of the operating frequency and of the capacitor structure." While the Cervin-Lawry concept of adding acoustic mirrors above or below the tunable capacitor has some merit, the explanation offered is simply incorrect. The addition of mirror will not force the absorption of acoustic energy at any frequency, much less away from the desired operating band. The mirror simply limits the acoustic radiation losses into the substrate at frequencies where it behaves as a reflector. The net result is to raise the acoustic Q factor of parasitic resonances within the capacitor structure. The reason for this is shown in FIG. 1, generally as 100. An acoustic mirror 110 is fabricated between the tunable dielectric 102 of the tunable capacitor and the substrate 104. An analysis of the acoustic mirror as an infinite structure in the z direction yields the dispersion diagram shown in FIG. 1(*b*). For this example of platinum/titanium, multiple acoustic stopbands are observed with the lowest frequency stopband, or fundamental stopband, occurring from about 1 GHz to 2 GHz. Within the stopbands the acoustic mirror effectively isolates the substrate as a loss mechanism.

However, the acoustic mirror or Bragg reflector as described above does not prevent acoustic resonances. It simply makes the resonances more frequency selective. Thus, there is a strong need for an invention which may eliminate the acoustic resonance altogether, albeit over a limited frequency range.

SUMMARY OF THE INVENTION

An embodiment of the present invention an apparatus, comprising a stack of at least three ferroelectric layers with a top side and bottom side of each of the ferroelectric layers contacting an electrode layer, wherein the ferroelectric layers and the electrode layers form a substantially periodic structure in the direction normal to the ferroelectric and electrode layers, and wherein an acoustic characteristic impedance and thickness of each layer are selected to realize an acoustic bandgap over a desired frequency band. In an embodiment of the present invention all ferroelectric layers except for one intentionally tunable layer are rendered acoustically inert by electrically shorting the electrodes on opposite sides of the remaining ferroelectric layers; or in an embodiment of the present invention all ferroelectric layers except for two layers are rendered acoustically inert by electrically shorting the electrodes on opposite sides of a given ferroelectric layer.

The electrodes may be metal layers and wherein the metal layers may have essentially the same acoustic characteristic impedance and the same thickness. Further, the electrically shorting may be accomplished by conductive vias and the ferroelectric layers may have essentially the same acoustic characteristic impedance and the same thickness. The electrode layers may each be comprised of multiple sublayers and further comprising at least one additional passivation layer and at least one final metal interconnect layers used for wire bonding or flip-chip attachment to the next level of assembly.

Yet another embodiment of the present invention provides a tunable ferroelectric capacitor, comprising a multilayer one dimensional periodic structure containing multiple unit cells, wherein each unit cell contains a plurality of ferroelectric layers with layers of low and high acoustic characteristic impedance and wherein the acoustic impedances of individual layers in the unit cells are selected to produce an acoustic bandgap for a desired frequency band.

Still another embodiment of the present invention may provide for a method for improving the quality factor of a tunable ferroelectric capacitor, comprising selecting ferroelectric layers and conductive electrode layers to form unit cells, fabricating the unit cells into one-dimensional periodic structures and selecting the thicknesses of each layer to form an acoustic bandgap over the frequency range where the quality factor is desired to be improved. The method may further comprise rendering acoustically inert all ferroelectric layers except for one or two intentionally tunable layers by electrically shorting the electrodes on opposite sides of the remaining ferroelectric layers.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

Figure 1:
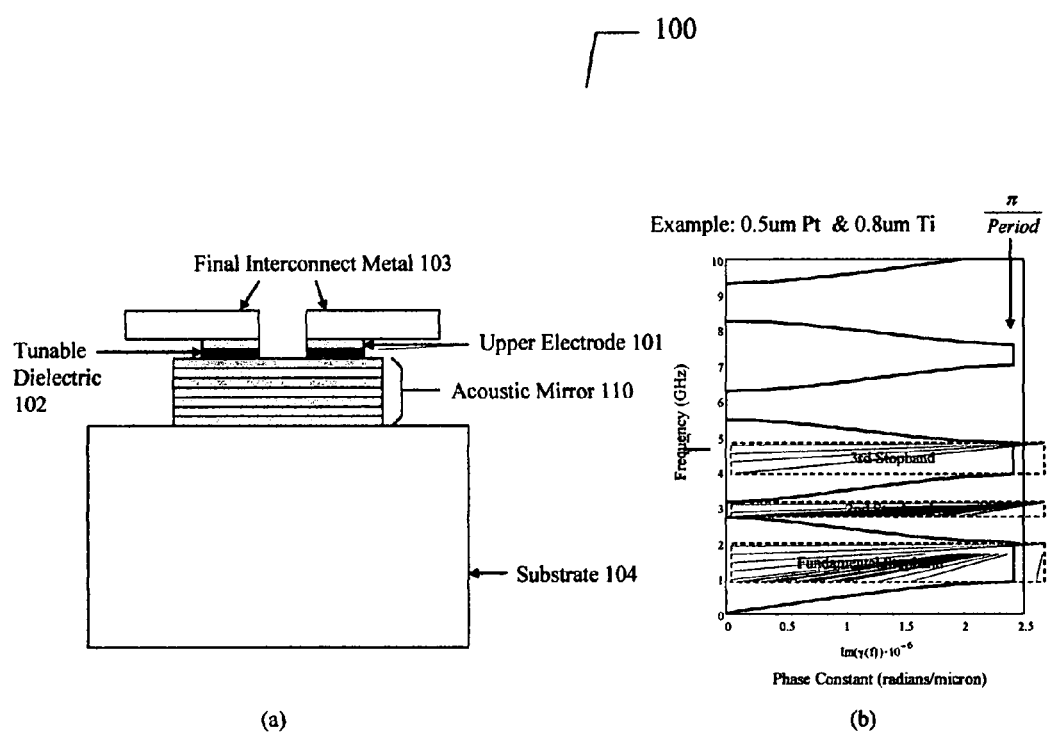
FIG. 1 (prior art) illustrates (a) an acoustic mirror which is fabricated below a tunable ferroelectric capacitor and (b) an example of the dispersion diagram showing acoustic stopbands for the mirror.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Use of the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" may be used to indicate that two or more elements are in either direct or indirect (with other intervening elements between them) physical or electrical contact with each other, and/or that the two or more elements co-operate or interact with each other (e.g. as in a cause an effect relationship).

An embodiment of the present invention improves the device Q of tunable integrated circuit capacitors that are fabricated using thin ferroelectric films. Acoustic resonances in the form of z axis bulk acoustic waves (BAW) are excited parasitically at microwave frequencies because the ferroelectric films are electrostrictive. The applied RF electric field across the films will launch BAWs in the direction of the E field vector (the z axis). An embodiment of the present invention may consist of fabricating the tunable integrated circuit capacitor as a periodic structure in the z axis with repeating layers of ferroelectric films and metal electrodes. Materials and thicknesses of individual layers may be selected to design an acoustic bandgap (ABG) for a frequency range where parasitic resonances are desired to be suppressed. In this manner the device Q is improved over the frequency range associated with the ABG. In its most fundamental form, some embodiments of the present invention may consist of a tunable ferroelectric capacitor fabricated as a multilayer one dimensional periodic structure (along the z axis) where the acoustic impedance of adjacent layers alternates between high and low impedance values. Each unit cell of the periodic structure contains a ferroelectric layer. The thickness of individual layers may be selected to realize an acoustic bandgap (ABG), or stopband, for z directed longitudinal waves over a frequency range where the device Q is desired to be improved. Although not limited in this respect, typically, the material layer with the lower acoustic characteristic impedance is the ferroelectric layer, and the material layer with the higher acoustic characteristic impedance is the conductive electrode layer. However, that is not a restriction of this invention as advances in non-metallic conductors may reverse this assumption. It is understood that the ABG is a result of the contrast in acoustic impedances between adjacent layers of the periodic structure, not a specific material.

It is another feature of this invention that some of the ferroelectric layers may be made acoustically inert by electrically shorting the electrodes together on both sides of the given ferroelectric layer. The purpose of this feature is to limit the location within the periodic stack where acoustic energy may be generated. Although not limited in this respect, an embodiment of the present invention provides that this location be limited to near the center of the stack where the waves generated by the active acoustic layer(s) see multiple reflections from interfaces located both above and below the active layer(s). This makes the active layer(s) appear to be embedded in an infinite periodic structure.

Figure 2:
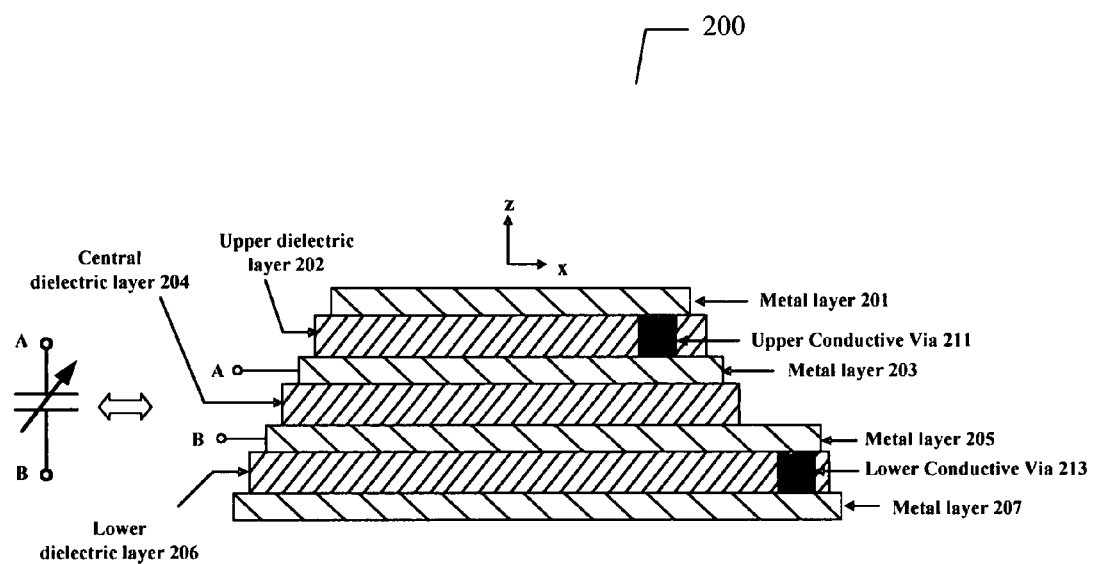
FIG. 2 is an embodiment of the present invention showing a tunable capacitor with one active or electrostrictive dielectric layer.

Turning now to FIG. 2 at 200 is a first embodiment of the present invention. This is a thin film tunable capacitor fabricated as a layered structure in the z direction. Dielectric layers 202, 204, and 206 are stacked ferroelectric layers of essentially the same acoustic characteristic impedance and the same thickness. The ferroelectric material may be BaSrTi, BaSrTiO, SrTiO, or any other voltage dependent dielectric film. These dielectric layers are sandwiched between conductive electrode layers which are described in FIG. 2 as metal layers 201, 203, 205, and 207. These metal layers have essentially the same acoustic characteristic impedance and the same thickness. Typically these metal layers would be identical materials, but not necessarily and the present invention is not limited to this. Given these restrictions, the structure of FIG. 2 is a 1D periodic acoustic structure.

Furthermore, metal layers 201 and 203 may be electrically shorted together by a conductive via 211. Metal layers 205 and 207 may also be electrically shorted together by a conductive via 213. Multiple vias may be employed within the upper and/or lower dielectric layers 202 and 206 although only one is shown in each layer. The purpose of these vias is to prevent the upper and lower dielectric layers from becoming acoustic transducers, or acoustically active by ensuring that the metal layers connected to these vias is at the same electrical potential and so cannot excite acoustic waves. So the only tunable dielectric layer available is the central dielectric layer. Although FIG. 2 illustrates shorting vias 211 and 213 as the means of maintaining the same voltage potential for the metal layers they connect, any means of electrically shorting together the upper pair of metal layers, and any means of electrically shorting the lower pair of metal layers will suffice to make the ferroelectric dielectric layers 202 and 206 acoustically inert.

Figure 3:
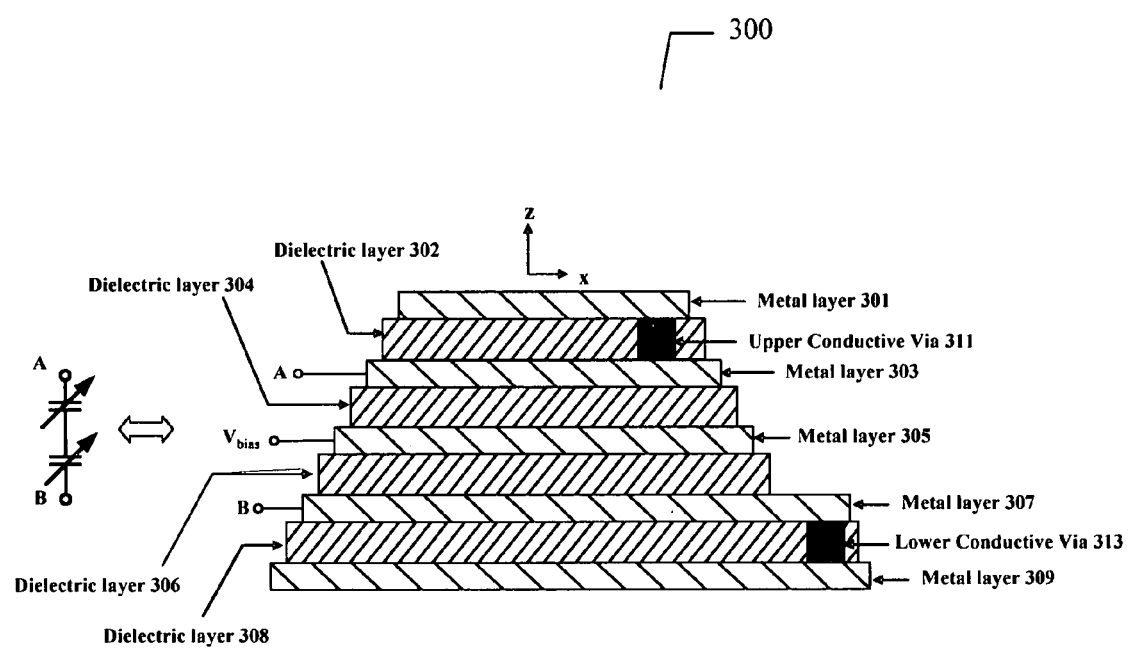
FIG. 3 is an embodiment of the present invention showing a tunable capacitor with two active or electrostrictive dielectric layers.

A second embodiment of the present invention is illustrated in FIG. 3, shown generally as 300. This is similar to the first embodiment except that there is an additional ferroelectric dielectric layer and it is allowed to be acoustically active. In this embodiment, four ferroelectric dielectric layers 302, 304, 306, and 308 are stacked between conductive electrodes of metal layers 301, 303, 305, 307, and 309. Again these layers form an acoustically periodic stack where each of the dielectric layers have essentially the same acoustic impedance $Z_{o1}$ and the same thickness $t_1$, and each of the metal layers have essentially the same acoustic impedance $Z_{o2}$ and the same thickness $t_2$. The ratio of $Z_{o2}/Z_{o1}$ is designed to be as large as possible through appropriate selection of materials. Ideally, the thickness $t_1$ and $t_2$ are each designed to be one-quarter of a guide wavelength at the center frequency of the desired acoustic bandgap (ABG). Deviations from this ideal value of thickness will reduce the stopband bandwidth, but the stopband will still be present.

A second embodiment of the present invention is an extension of stacked tunable capacitors where the middle electrode (metal layer 305) is biased at a DC voltage and the top and bottom electrodes (metal layers 303 and 307) are held at ground voltage. This biasing scheme ensures that the biasing electric fields in dielectric regions 304 and 306 are antipodal, or counter-directed. When so biased, the superimposed RF fields will launch acoustic waves from dielectric layers 304 and 306 that essentially cancel each other at a certain frequency associate with the lowest acoustic resonance of the structure. However, certain higher order acoustic modes will not cancel and this is the reason for the ABG structure.

To predict the acoustic bandgaps (ABGs) that may be realized from the aforementioned embodiments, one may approximate the stack with an equivalent transmission line model of an infinite periodic structure. A unit cell is identified and its ABCD parameters are calculated. Given parameters A and D, the propagation constant is readily calculated. To detail this process, consider FIG. 4 at 400 with transmission line model 410 and physical structure 420 where one unit cell is defined to extend from the center of a given low impedance layer to the center of an adjacent low impedance layer. The network ABCD parameters of a unit cell may be calculated through matrix multiplication as $$\begin{bmatrix} A & B \\ C & D \end{bmatrix} = \qquad (1)$$

$$\begin{bmatrix} \cos\left(\beta_1 \frac{t_1}{2}\right) & jZ_{o1}\sin\left(\beta_1 \frac{t_1}{2}\right) \\ \frac{j}{Z_{o1}}\sin\left(\beta_1 \frac{t_1}{2}\right) & \cos\left(\beta_1 \frac{t_1}{2}\right) \end{bmatrix} \begin{bmatrix} \cos(\beta_2 t_2) & jZ_{o2}\sin(\beta_2 t_2) \\ \frac{j}{Z_{o2}}\sin(\beta_2 t_2) & \cos(\beta_2 t_2) \end{bmatrix}$$

$$\begin{bmatrix} \cos\left(\beta_1 \frac{t_1}{2}\right) & jZ_{o1}\sin\left(\beta_1 \frac{t_1}{2}\right) \\ \frac{j}{Z_{o1}}\sin\left(\beta_1 \frac{t_1}{2}\right) & \cos\left(\beta_1 \frac{t_1}{2}\right) \end{bmatrix}$$

where the acoustic characteristic impedance of each layer is $$Z_{oi} = \rho_i v_i A \text{ for } i=1,2. \qquad (2)$$

For the $i^{th}$ layer the mass density is $\rho_i$ and the speed of longitudinal sound waves is $v_i$.

The variable A is the area of the layers in the stack. We will assume for analysis that the area A is uniform throughout the stack, but that assumption may not be strictly true in practice due to manufacturing process limitations and design rules. The thickness of the low and high impedance layers are $t_1$ and $t_2$ respectively and the period P is defined as $P = t_1 + t_2$. The phase constants for each layer are given as $\beta_i = \omega/v_i$ where $\omega = 2\pi f$ is the angular frequency. Finally, the Bloch mode propagation constant is given by the expression $$\gamma = \alpha_z + j\beta_z = \frac{1}{P}\cosh^{-1}\left(\frac{A+D}{2}\right) \qquad (3)$$

where $\alpha_z$ is the attenuation constant and $\beta_z$ is the phase constant for the Bloch mode. A Bloch mode is a wave that travels in a periodic structure such that $$V_{n+1} = V_n e^{-\gamma P} \quad (4)$$

where $V_n$ and $V_{n+1}$ are the voltages (surrogate for mechanical stress) at opposite ends of a unit cell of period P. By substituting A and D terms of (1) into (3), the dispersion equation for the propagation of acoustic Bloch modes in the canonical structure of FIG. 4 may be written in closed form as $$\cosh(\gamma P) = \cos(\beta_1 t_1)\cos(\beta_2 t_2) - \frac{1}{2}\left(\frac{Z_{o1}}{Z_{o2}} + \frac{Z_{o2}}{Z_{o1}}\right)\sin(\beta_1 t_1)\sin(\beta_2 t_2). \quad (5)$$

At the band edges of the fundamental stopband, $\gamma = j\pi/P$ since the dispersion diagram intersects the Brillion zone boundary. So the dispersion equation reduces to $$-1 = \cos(\beta_1 t_1)\cos(\beta_2 t_2) - \frac{1}{2}\left(\frac{Z_{o1}}{Z_{o2}} + \frac{Z_{o2}}{Z_{o1}}\right)\sin(\beta_1 t_1)\sin(\beta_2 t_2). \quad (6)$$

Equation (6) may be solved numerically using conventional root finding techniques to determine the frequencies of the band edges. Note that as $Z_{o1}$ approaches $Z_{o2}$ then the bandwidth of the fundamental stopband goes to zero. Hence, a contrast in characteristic impedances is necessary for the acoustic bandgap to exist.

Figure 4:
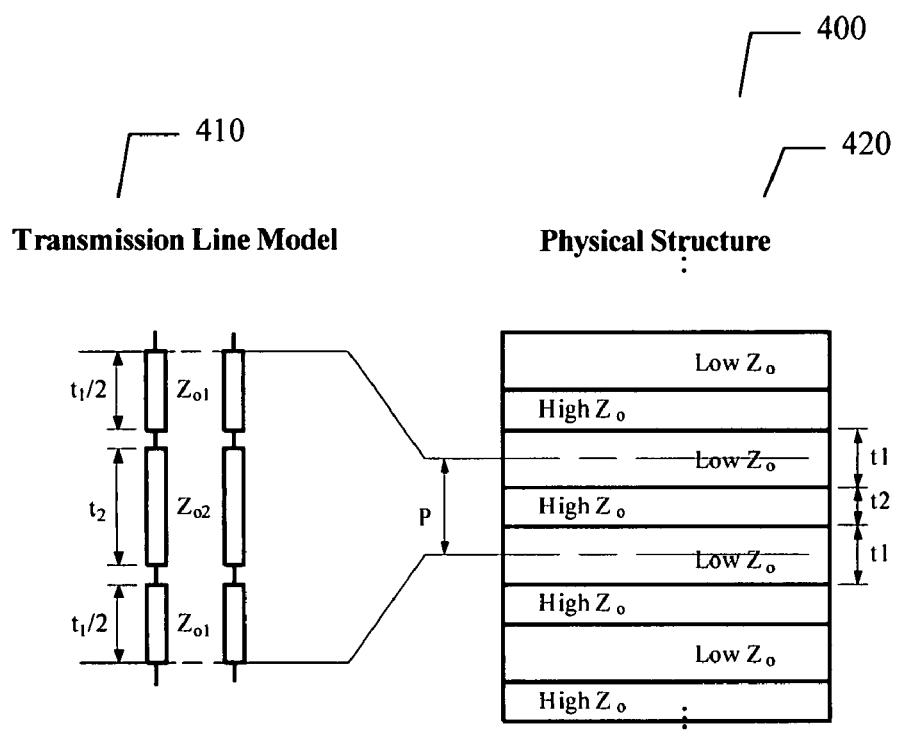
FIG. 4 depicts an equivalent acoustic transmission line model for the unit cell of a periodic structure for embodiments of the present invention.
Figure 5:
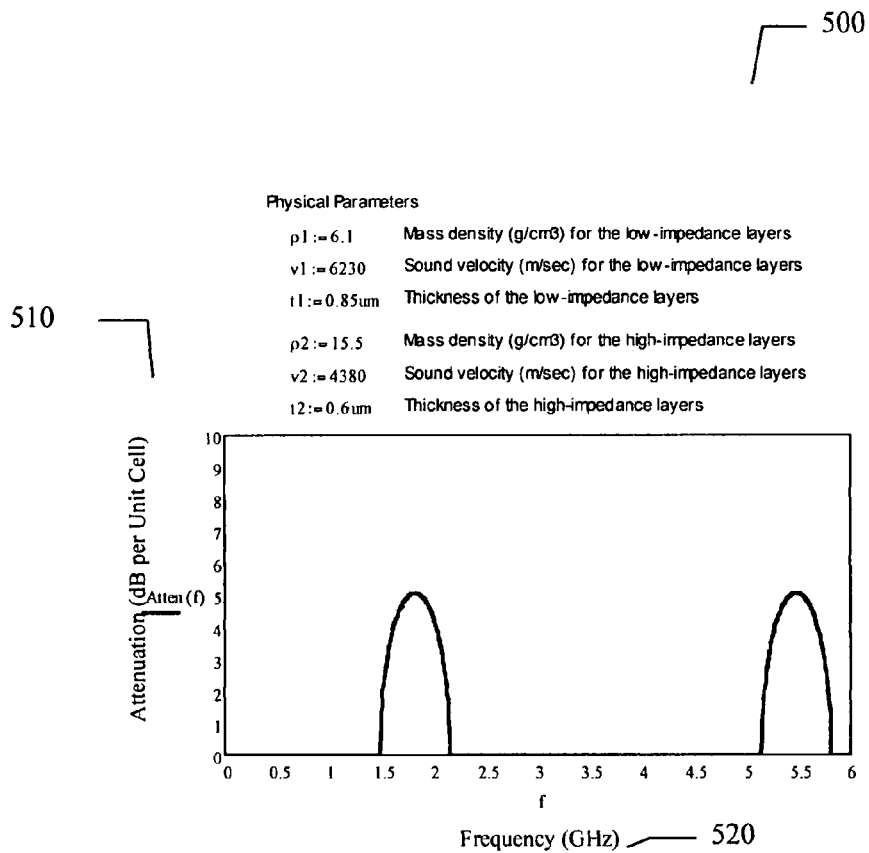
FIG. 5 illustrates the attenuation function for an ABG structure shown in FIG. 4 where the layer 1 is a ferroelectric film and layer 2 is a platinum electrode of an embodiment of the present invention.

Now assume that the low impedance layers in the infinite 1D structure of FIG. 4 are a ferroelectric ceramic dielectric with parameters shown graphically in FIG. 5 as frequency 520 vs. attenuation 510. Furthermore, assume that the high impedance layers are platinum, also with parameters listed in FIG. 5. Then the attenuation constant $\alpha_z$ is also shown plotted in FIG. 5. Note that this plot of attenuation is in dB per unit cell. Non-zero values represent the frequency range over which stopbands are predicted. For this example we observe a fundamental stopband (the lowest frequency stopband) that extends from about 1.5 GHz to 2.15 GHz. The layer thicknesses have been designed to place the center of the fundamental stopband near 1.8 GHz. At the center of the fundamental stopband, the sum of the electrical lengths of layers 1 and 2 are equal to half of a wavelength:

$$\beta_1 t_1 + \beta_2 t_2 = \pi \quad (7)$$

Acoustic bandgaps are tuned in frequency by designing appropriate layer thicknesses. In the example of FIG. 5 the platinum layer is 0.6 um thick. This layer may be too thick to realize in practice due to the formation of defects during manufacturing. However, one may fabricate composite electrode structures where each metal (platinum) layer of FIG. 3 is replaced by three thinner metal layers. This is shown in FIG. 6, generally as 600.

Figure 6:
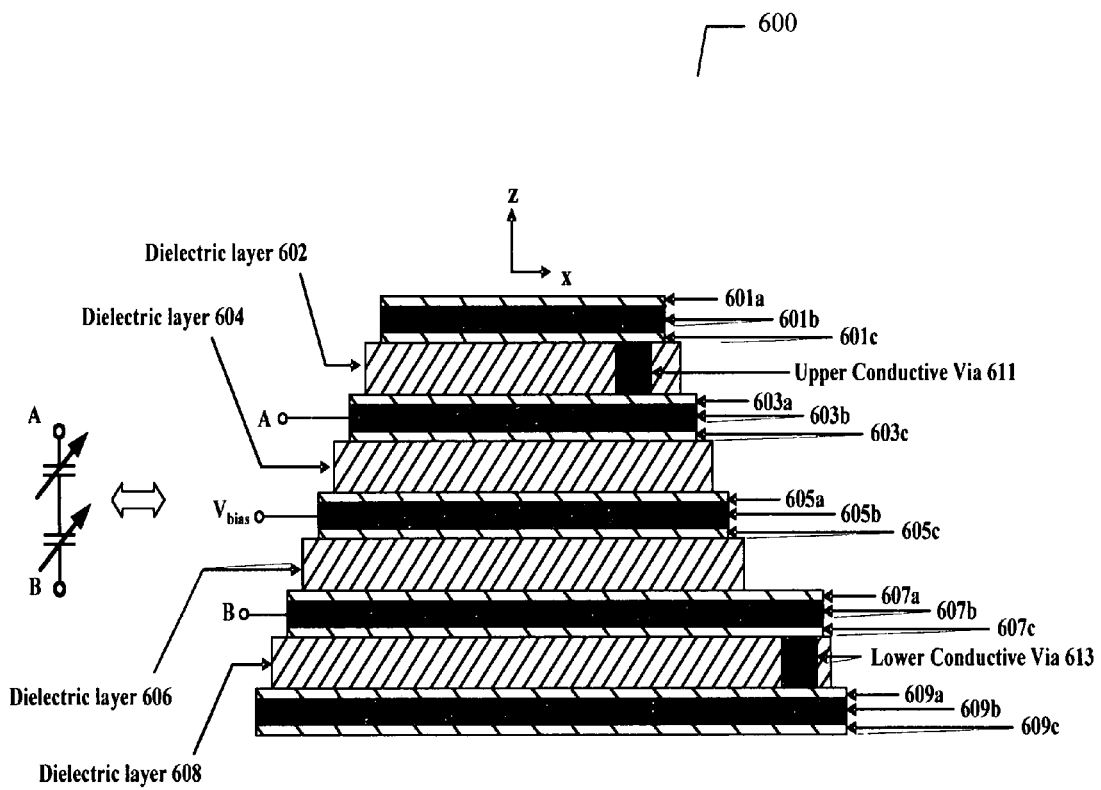
FIG. 6 depicts a tunable capacitor containing composite metal electrodes included in a third embodiment of the present invention.

FIG. 6, generally at 600, illustrates embodiment C where metal layers 601, 603, 605, 607, and 609 are each comprised of three sublayers: a, b, c. The reason for this is to make a relatively thick electrode while limiting the platinum thickness to less than 0.25 um. Platinum is the only metal proven to be useful as an electrode for BST or BSTO ceramics. The metal sublayers, 601b, 603b, 605b, 607b, and 609b are the highest acoustic characteristic impedance layers. These sublayers may be made from a very dense refractory metal such as iridium. Not only will the composite metal electrode structure shown in FIG. 6 permit thicker electrode layers than using platinum alone, but it will make the acoustic stopbands wider and the acoustic attenuation within those stopbands greater. This will be shown in the following example. Another potential benefit of using the composite metal electrodes is to reduce the electrode resistance compared to the alternative of using thinner platinum electrodes.

FIG. 6 illustrates a case where the electrodes employ three conductive sublayers. The use of three sublayers is not meant to be limiting as four, five, or other multiples of conductive sublayers may be used in practice. This may be the case if one counts adhesion 15 layers. Also, to build certain designed thicknesses it may be necessary to subdivide the inner sublayers 601b, 603b, 605b, 607b, and 609b into multiple sublayers of high acoustic impedance, possibly sandwiched between thinner adhesion layers.

Figure 7:
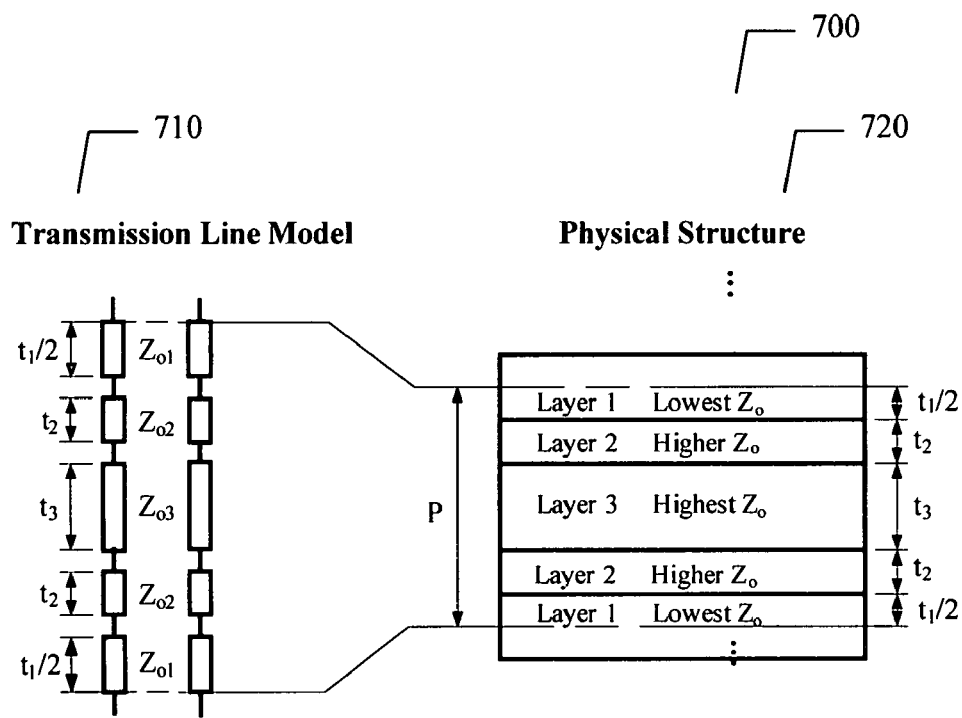
FIG. 7 depicts an equivalent acoustic transmission line model for the three layer unit cell of a periodic structure for the embodiment of FIG. 6.

FIG. 7, generally at 700, shows an equivalent transmission line model that may be used to predict the stopbands for embodiment C shown in FIG. 6. The analysis of the Bloch mode propagation constant for embodiment C parallels the development demonstrated above for embodiments A and B. The only difference is an additional layer of metal and its associated ABCD matrix. Again, for mathematical convenience, we select the edges of the unit cell to be the midpoint or centerline of the lowest impedance layer. These lowest impedance layers, denoted as layer 1 in FIG. 7, correspond to the ferroelectric dielectric layers 602, 604, 606, and 608 in FIG. 6. Layer 2 refers to the outer layers of the composite metal electrode, namely 601a, 601c, 603a, 603c, 605a, 605c, 607a, 607c, 609a, and 609c. Layer 3 refers to the center of the composite electrode, namely 601b, 603b, 605b, and 607b.

The network ABCD parameters of a unit cell shown in FIG. 7 may be calculated through matrix multiplication as a cascade of five matrixes, $$\begin{bmatrix} A & B \\ C & D \end{bmatrix} = M_1 M_2 M_3 M_2 M_1, \quad (8)$$

where $$M_1 = \begin{bmatrix} \cos\left(\beta_1 \frac{t_1}{2}\right) & jZ_{o1}\sin\left(\beta_1 \frac{t_1}{2}\right) \\ \frac{j}{Z_{o1}}\sin\left(\beta_1 \frac{t_1}{2}\right) & \cos\left(\beta_1 \frac{t_1}{2}\right) \end{bmatrix}, \quad (9)$$

$$M_2 = \begin{bmatrix} \cos(\beta_2 t_2) & jZ_{o2}\sin(\beta_2 t_2) \\ \frac{j}{Z_{o2}}\sin(\beta_2 t_2) & \cos(\beta_2 t_2) \end{bmatrix}, \quad (10)$$

and $$M_3 = \begin{bmatrix} \cos(\beta_3 t_3) & jZ_{o3}\sin(\beta_3 t_3) \\ \frac{j}{Z_{o3}}\sin(\beta_3 t_3) & \cos(\beta_3 t_3) \end{bmatrix}. \quad (11)$$

Again, the acoustic characteristic impedance of each layer is $Z_{oi} = \rho_i v_i A$ for i=1, 2, 3. For the $i^{th}$ layer the mass density is $\rho_i$ and the speed of longitudinal sound waves is $v_i$. The period P which represents the total thickness of a unit cell is now defined as $P = t_1 + 2t_2 + t_3$. The Bloch mode propagation constant $\gamma$ is calculated from equation (3) listed above. In the examples shown in this disclosure, the units cells are physically symmetric, which means A=D, and the formula for propagation constant then reduces to $$\gamma = \frac{1}{P}\cosh^{-01}(A). \quad (12)$$

Figure 8:
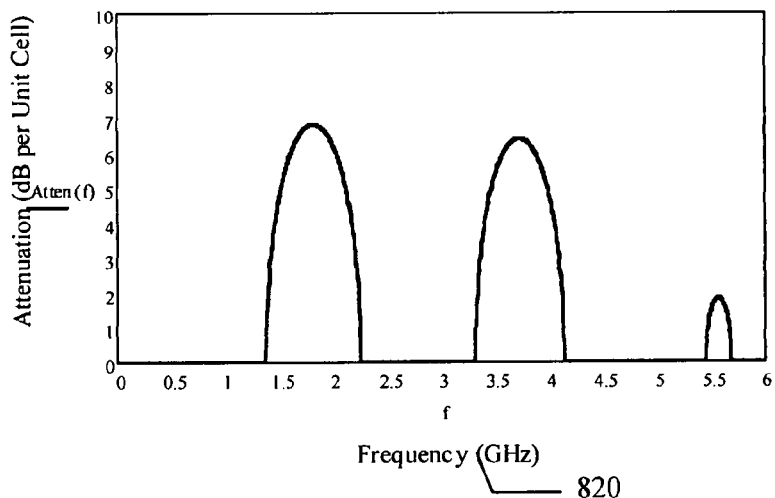
FIG. 8 graphically illustrates the attenuation function for an ABG structure shown in FIG. 6 where the layer 1 is a ferroelectric film, layer 2 is platinum, and layer 3 is iridium.

Now assume that the low impedance layers in the infinite 1D structure of FIG. 7 are a ferroelectric ceramic dielectric with parameters shown in FIG. 8. Assume that layer number 2 is platinum and that layer number 3 is selected to be iridium because its acoustic characteristic impedance is even higher than that of platinum. The associated parameters are listed in FIG. 8. Then the attenuation constant, Re($\gamma$), is also shown in FIG. 8. Non-zero values represent the frequency range over which stopbands are predicted. Here we observe a fundamental stopband (the lowest frequency stopband) that extends from about 1.35 GHz to 2.2 GHz. The layer thicknesses of $t_1$, $t_2$, and $t_3$ have been designed to place the center of the fundamental stopband near 1.8 GHz. A higher order stopband is also observed from below 3.4 GHz to near 4.1 GHz.

It should be understood that there may be additional layers in the tunable capacitor structure beyond what is illustrated in FIGS. 2, 3, and 6. To permit a manufacturable product, thin adhesion layers of titanium-tungsten (TiW) are often used between the ferroelectric and platinum layers. An adhesion layer is typically less than 0.1 um in thickness. A layer this thin may be ignored in the calculation of the propagation constant $\gamma$ because its ABCD matrix becomes asymptotic to the identity matrix as its thickness approaches zero.

Figure 9:
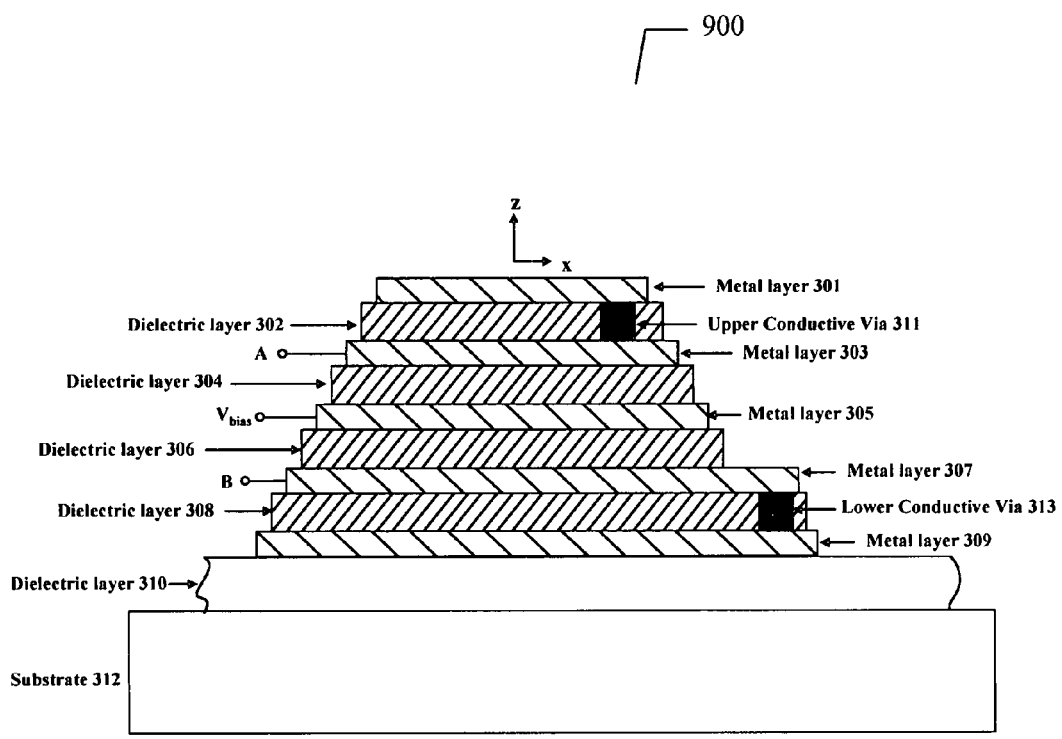
FIG. 9 shows an embodiment of the present invention showing the structure of a tunable capacitor fabricated on a dielectric buffer layer and a substrate.

FIGS. 2, 3, and 6 illustrate the essence of this invention without showing additional layers required for a manufacturable product. Capacitor designers of ordinary skill in the art will realize that the capacitor structures shown above may be fabricated as a mesa structure on a dielectric buffer layer used for planarization, although the present invention is not limited in this respect. Furthermore the tunable capacitors of this invention may be fabricated on a rigid substrate such as sapphire, alumina, silicon, or many other substrate materials. These additional layers are shown in FIG. 9 at 900 as layers 310 and 312 respectively. Other layers not shown but necessary for manufacturing include passivation layers and final metal interconnect layers used for wire bonding or flip-chip attachment to the next level of assembly.

To further understand this invention, one may simulate the input impedance and device Q for the above capacitor structures. An examination of the device Q will reveal no nulls in quality factor over the frequency range associated with the ABG, which is equivalent to having no acoustic resonances in the frequency range of the ABG.

As an example, consider the relatively simple capacitor structure of embodiment A shown in FIG. 2. An equivalent transmission line model for BAWs traveling normal to the interfaces is given in FIG. 10 at 1000. Since loss mechanisms must be included to see the nulls in quality factor, let there be an acoustic mechanical quality factor $Q_i$, i=1,2 associated with each layer. As discussed above, let subscript 1 refer to the ferroelectric dielectric layers (202, 204, and 206) and let subscript 2 refer to the metal electrode layers (201, 203, 205, 207). It is assumed that characteristic impedance of each layer is slightly complex, and it may be modeled as $$Z_{oi} = \rho_i v_i \left(1 + j\frac{1}{2Q_i}\right) A \quad (13)$$

where the sound velocity in each layer is modeled as a complex value in the first quadrant. Hence the characteristic impedance is slightly complex. Assume the outermost metal layers 201 and 207 are terminated by infinite air regions where acoustic waves see a termination impedance of $R_{air} = \rho_{air} v_{air} A$. The phase constants for BAWs traveling in layers i=1 and 2 may be modeled as $$\beta_i(f) = \frac{2\pi f}{v_i}\left(1 - \frac{j}{2Q_i}\right). \quad (14)$$

Figure 10:
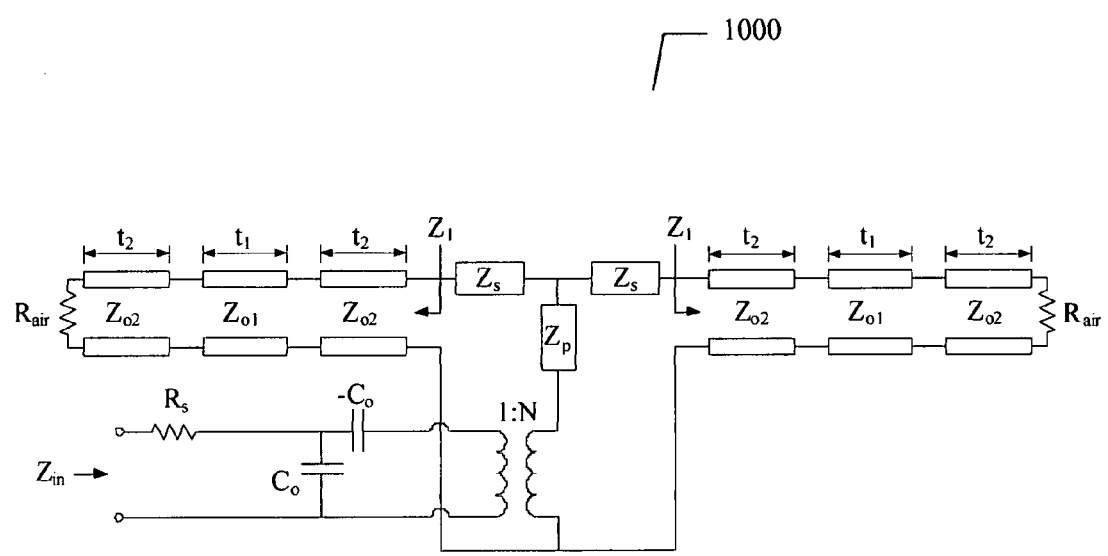
FIG. 10 illustrates an equivalent circuit model for the acoustic resonator shown in FIG. 2 of an embodiment of the present invention.

A linear equivalent circuit model for Embodiment A of FIG. 2 is illustrated below in FIG. 10. The central dielectric layer 204 is modeled with Mason's model which includes the lumped capacitors $C_o$ and $-C_o$, the transformer, the series impedance $$Z_s = jZ_{o1}\tan\left(\beta_1 \frac{t_1}{2}\right) \quad (15)$$

and the parallel impedance of $$Z_p = -jZ_{o1}csc(\beta_1 t_1). \quad (16)$$

The turns ratio in Mason's model is given by $$N = hC_o \quad (17)$$

where $$C_o = \frac{\varepsilon_{r1}\varepsilon_o A}{t_1}(1 - j\tan\delta) \quad (18)$$

is the parallel plate capacitance across dielectric layer 204. The loss tangent in equation (18) models the electric dielectric loss of the dielectric layer 204. The parameter h is the ratio of the piezoelectric stress coefficient e to the dielectric constant $\in_{r1}\in_o$ for the tunable dielectric layer 204.

Calculation of the input impedance requires that impedance $Z_1$ first be known. It may be calculated from $$Z_1 = A/C, \quad (19)$$

where A and C are two port network parameters defined as $$\begin{bmatrix} A & B \\ C & D \end{bmatrix} = M_2 M_1 M_2 M_3, \quad (20)$$

where $$M_i = \begin{bmatrix} \cos(\beta_i t_i) & jZ_{oi}\sin(\beta_i t_i) \\ \frac{j}{Z_{oi}}\sin(\beta_i t_i) & \cos(\beta_i t_i) \end{bmatrix} \text{ for } i = 1, 2 \quad (21)$$

and $$M_3 = \begin{bmatrix} 1 & 0 \\ 1/R_{air} & 1 \end{bmatrix}. \quad (22)$$

The mechanical impedance that loads the transformer is $$Z_m = Z_p + \frac{Z_s + Z_1}{2}. \quad (23)$$

Therefore the input impedance may be calculated as $$Z_{in} = R_s + \frac{1}{j\omega C_o + \frac{1}{\frac{Z_m}{N^2} + \frac{-1}{j\omega C_o}}}. \quad (24)$$

Finally, the device Q may be calculated from $$Q = \frac{|\text{Im}\{Z_{in}\}|}{\text{Re}\{Z_{in}\}}. \quad (25)$$

Typical values for the parameters used in Embodiment A are listed below in Table 1.

TABLE 1

Typical Parameter Values for Embodiment A

| Parameter | Value | | Description |
|---|---|---|---|
| $\rho_1$ | 6100 | (kg/m$^3$) | Mass density for layer 1 |
| $v_1$ | 6230 | (m/sec) | Sound velocity in layer 1 |
| $t_1$ | 0.85 | (um) | Thickness of layer 1 |
| $Q_1$ | 100 | | Mechanical quality factor of layer 1 |
| $\epsilon_r$ | 350 | | Relative dielectric constant for layer 1 |
| tan δ | .005 | | Loss tangent for layer 1 |
| $\rho_2$ | 15480 | (kg/m$^3$) | Mass density for layer 2 |
| $v_2$ | 4380 | (m/sec) | Sound velocity in layer 2 |
| $t_2$ | 0.6 | (um) | Thickness of layer 2 |
| $Q_2$ | 25 | | Mechanical quality factor of layer 2 |
| $\rho_{air}$ | .01 | (kg/m$^3$) | Mass density for air |
| $v_{air}$ | 1100 | (m/sec) | Sound velocity in air |
| A | 3E−9 | (m$^2$) | Area of the capacitor |
| h | 5E8 | (V/m) | Piezoelectric coefficient |

Figure 11:
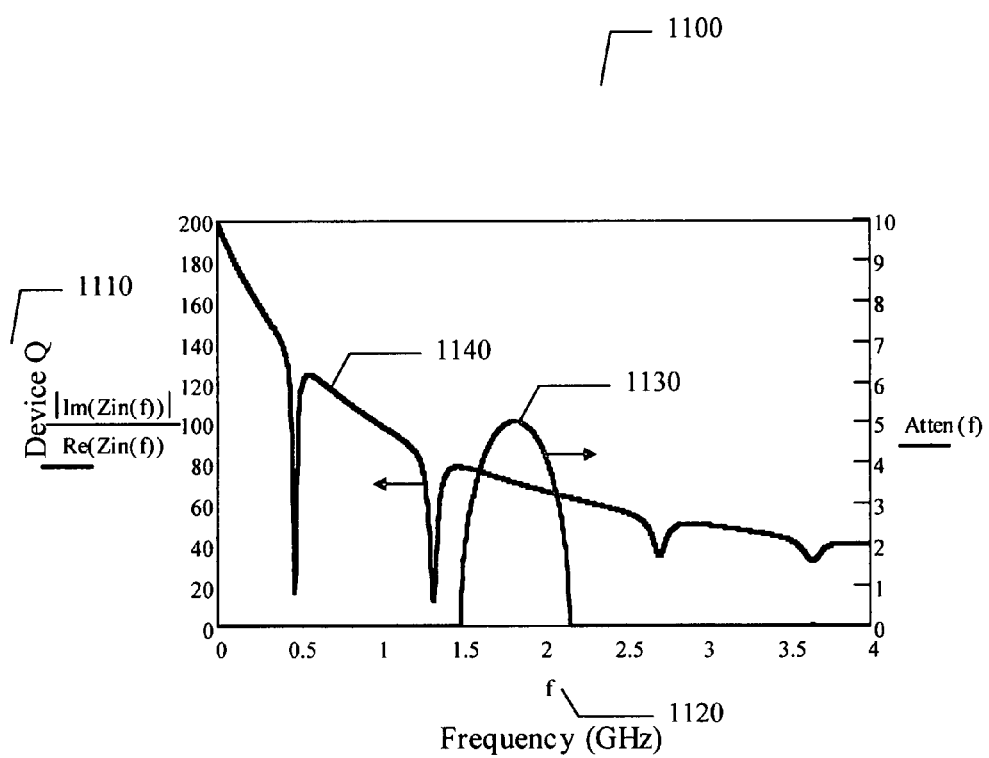
FIG. 11 graphically illustrates a comparison of the acoustic bandgap properties for the infinite structure of FIG. 4 to the device Q for the finite capacitor structure of FIG. 2 of one embodiment of the present invention.

To support the assertion that embodiments of the present invention will suppress acoustic resonances in finite sized capacitor structures, the attenuation function and the Q performance are plotted together in FIG. 11, generally as graph 1100, as Device Q 1110 vs. frequency 1120. The attenuation function for the infinite structure of FIG. 4 is the real part of the Bloch mode propagation constant as given by equations (1) and (3). It is plotted as the right axis 1130 curve in FIG. 11. The device Q of Embodiment A is plotted as the left axis curve 1140 in FIG. 11 where design parameters are listed in Table 1. For this example, acoustic resonances occur at four frequencies below 4 GHz. These frequencies are identified by the nulls in the Q curve: near 0.5 GHz, 1.3 GHz, 2.7 GHz and 3.65 GHz. In this example we calculate that the fundamental stopband extending from near 1.496 GHz to 2.162 GHz based on the use of equation (6). Note that the capacitor is free of acoustic resonances over the ABG.

Figure 12:
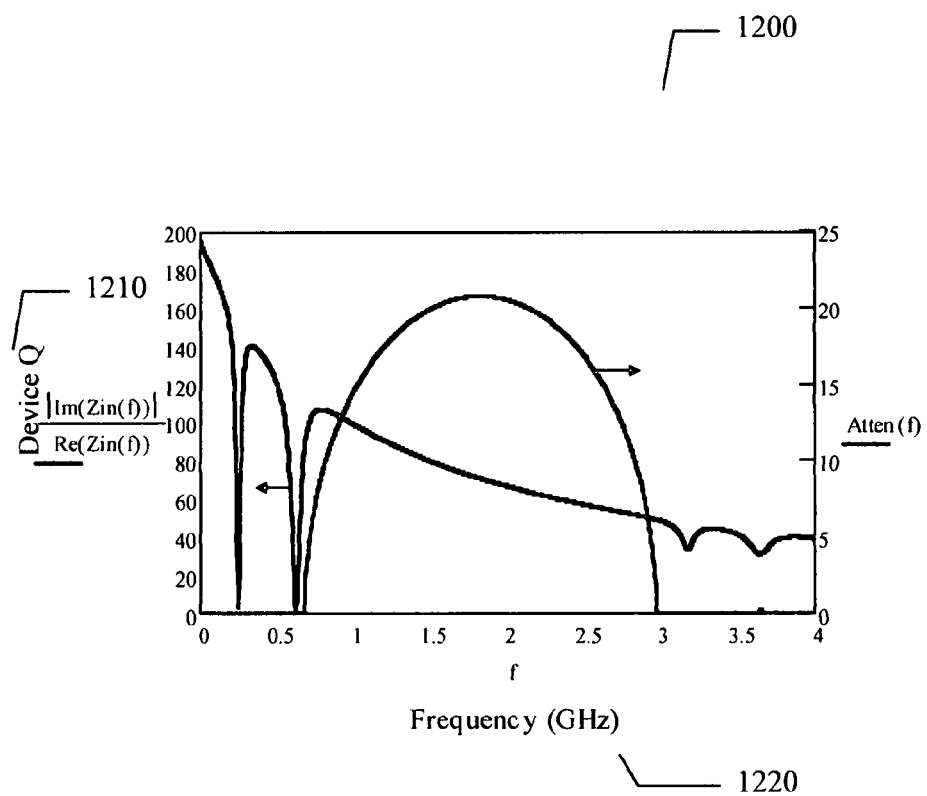
FIG. 12 depicts a comparison of the acoustic bandgap properties for the infinite structure of FIG. 4 to the device Q for the finite capacitor structure of FIG. 2 of one embodiment of the present invention.

For a second comparison of ABG to Q response, we arbitrarily let the density of the dielectric layers 202, 204, and 206 be reduced to 1000 kg/m$^3$. This will dramatically lower the acoustic impedance for the three dielectric layers, which will increase the bandwidth of the fundamental ABG. In this hypothetical example, all other parameters are held constant as listed in Table 1. This second comparison is shown in FIG. 12, generally as graph 1200, as Device Q 1210 vs. frequency 1220. Here we note that the fundamental ABG extends from 685 MHz to 2.97 GHz. Again there exists four acoustic resonances below 4 GHz, but they have been pushed out of the frequency range covered by the ABG. Again, all resonances fall outside of the ABG as desired.

Figure 13:
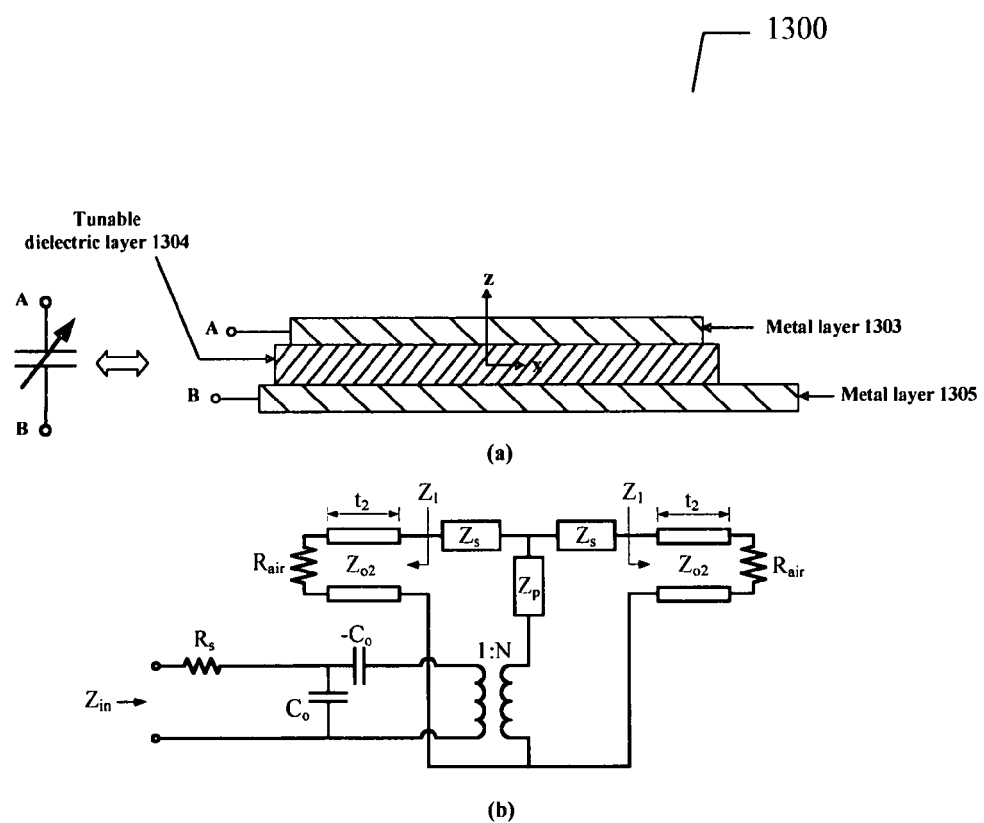
FIG. 13 shows (a) a prior art single layer tunable capacitor and, (b) its acoustic circuit model.
Figure 14:
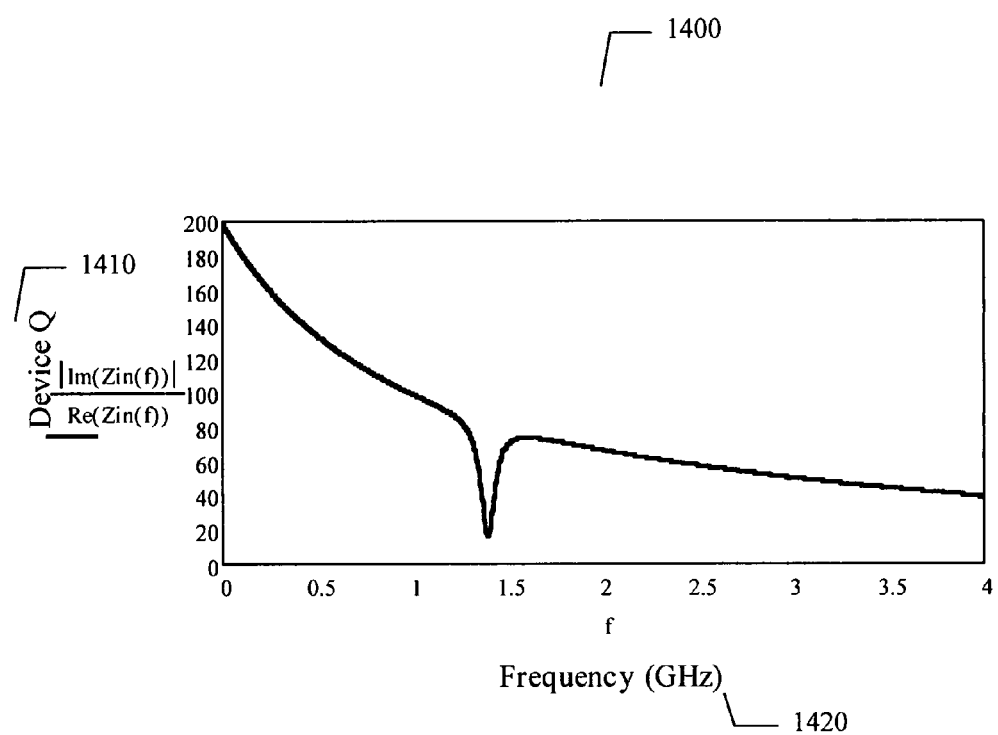
FIG. 14 illustrates device Q factor for the capacitor structure shown in FIG. 13 of one embodiment of the present invention.

It is important to understand that the invention described here is distinct from the straight forward application of acoustic mirrors built on the top and bottom of the tunable dielectric layer or layers which constitute the capacitor. To prove this assertion, let us examine a simple case. Consider the single layer capacitor shown in FIG. 13(a). The tunable dielectric layer 1304 and the metal layers 1303 and 1305 have the same material properties as listed in Table 1 for layers 1 and 2 respectively. However the thickness of the dielectric layer 1304 and metal layers 1303, 1305 have been set to 0.3 um and 0.6 um respectively to force an acoustic resonance to appear near the middle of L-band, namely near 1400 MHz. FIG. 14 at 1400 illustrates device Q factor 1410 vs. frequency 1420 for the capacitor structure shown in FIG. 13 of one embodiment of the present invention. The device Q shown in FIG. 14 was simulated using the acoustic circuit model illustrated in FIG. 13(b) using material parameters identified in Table 1.

Figure 15:
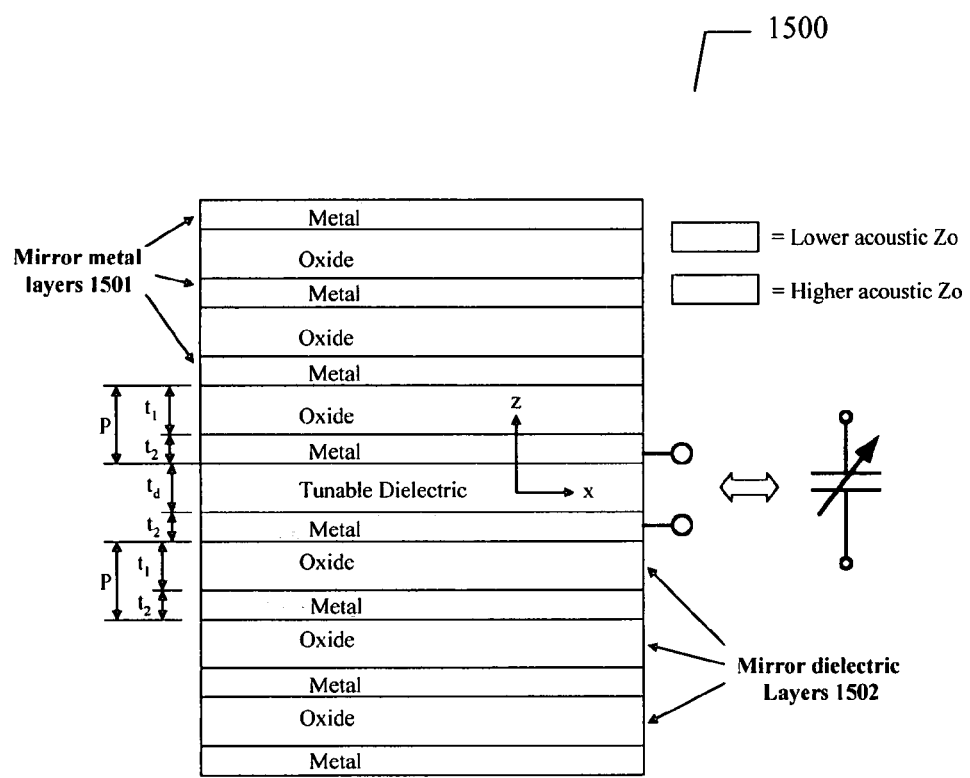
FIG. 15 depicts a tunable capacitor structure bounded on the top and bottom by acoustic mirrors.
Figure 16:
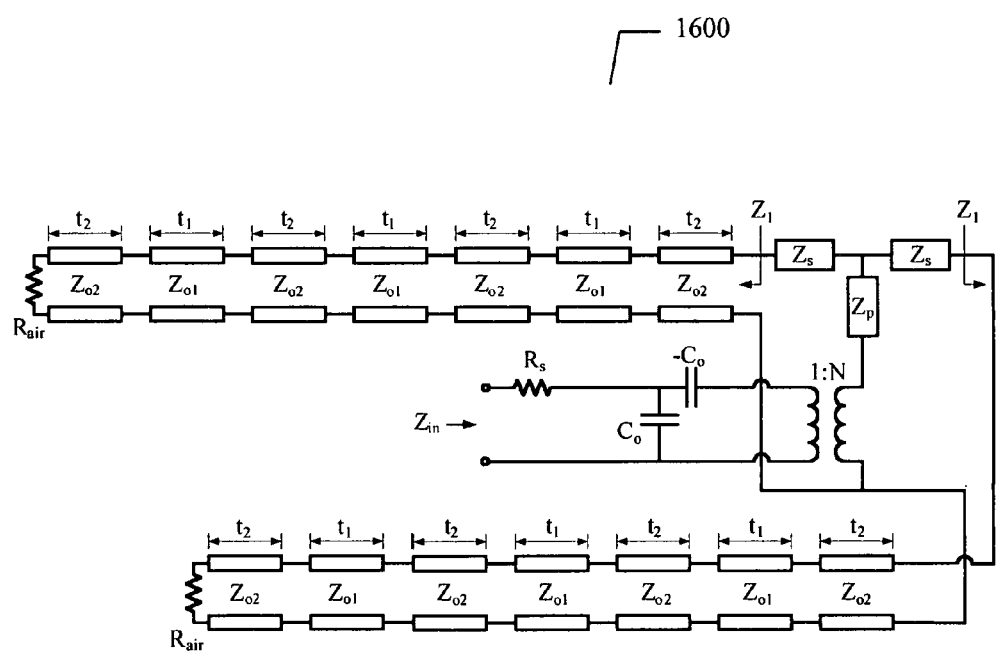
FIG. 16 illustrates an acoustic circuit model for the tunable capacitor structure shown in FIG. 15.

Now we will add broadband acoustic mirrors to the top and bottom of the capacitor structure of FIG. 13(a) without changing the material properties or thicknesses of the tunable dielectric layer 1304 or its adjacent electrodes 1303 and 1305. This modified structure is shown in FIG. 15, generally at 1500. The mirrors are fabricated from platinum metal (a high characteristic impedance material) and silicon dioxide (a low characteristic impedance material). The thickness of the platinum metal is maintained at 0.6 um to match the electrode thickness of the tunable capacitor, and the oxide thickness is adjusted to be 0.8 um which places the center of the mirror's stopband to be near 1.8 GHz. The top and bottom acoustic mirrors have identical periodic stacks, and their stopband extends from about 970 MHz to just above 2700 MHz. The density, sound velocity, and mechanical Q of the oxide layers are assumed to be 2200 kg/m$^3$, 5970 m/sec, and 25 respectively. The acoustic circuit model for the capacitor structure of FIG. 15 is shown in FIG. 16. See Table 1 for the remaining parameters of the Mason model.

Figure 17:
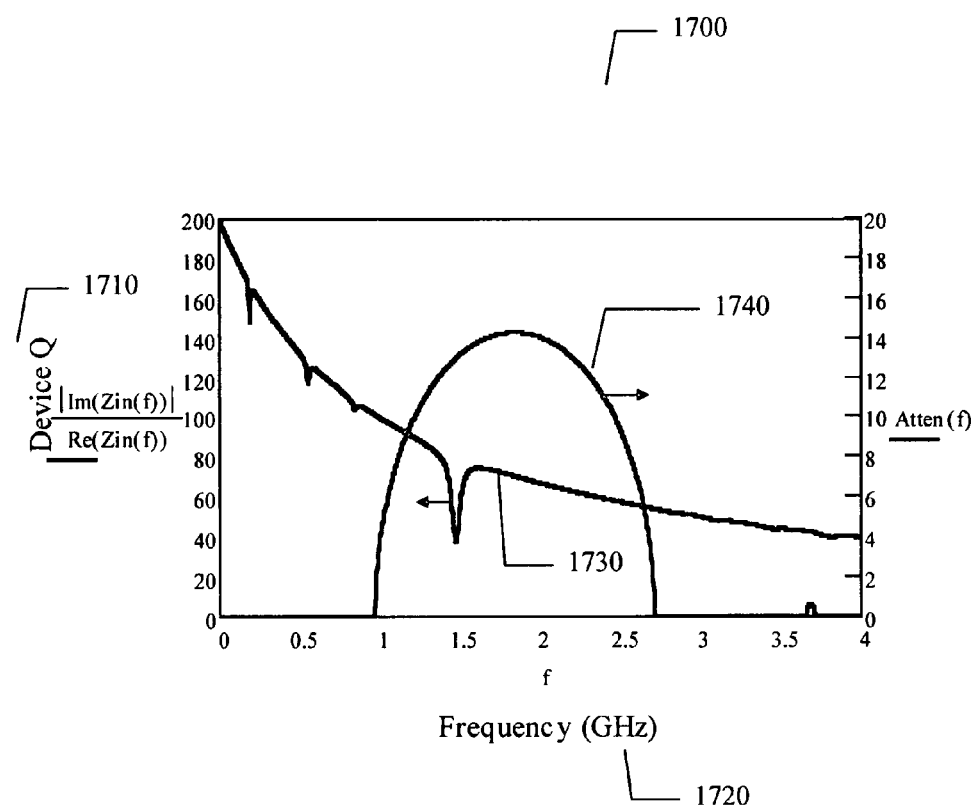
FIG. 17 graphically illustrates a comparison of the acoustic bandgap properties for the mirror structures shown in FIG. 15 to the device Q for the finite capacitor structure of FIG. 15.

The device Q of the capacitor structure of FIG. 15, with its elaborate mirrors, is shown in FIG. 17, generally as graph 1700, as Device Q 1710 vs. frequency 1720. This is the 1730 curve. Also plotted on the same graph is the stopband attenuation for the acoustic mirrors 1740. In this example we clearly see a null in the device Q near 1500 MHz which is evidence of an acoustic resonance. (Note that this resonance was near 1400 MHz for the same capacitor without mirrors.) Yet the acoustic mirrors where designed to suppress acoustic propagation over all of L-band. This example is proof that the simple application of acoustic mirrors on both sides of the capacitor is insufficient to guaranty that the acoustic resonances will be suppressed in the engineered stopband of the mirrors. What is needed to suppress resonances is a holistic design process where the tunable capacitor layer or layers are an integral part of the ABG structure. That goal is achieved through the use of embodiments of the present invention as described herein.

Figure 18:
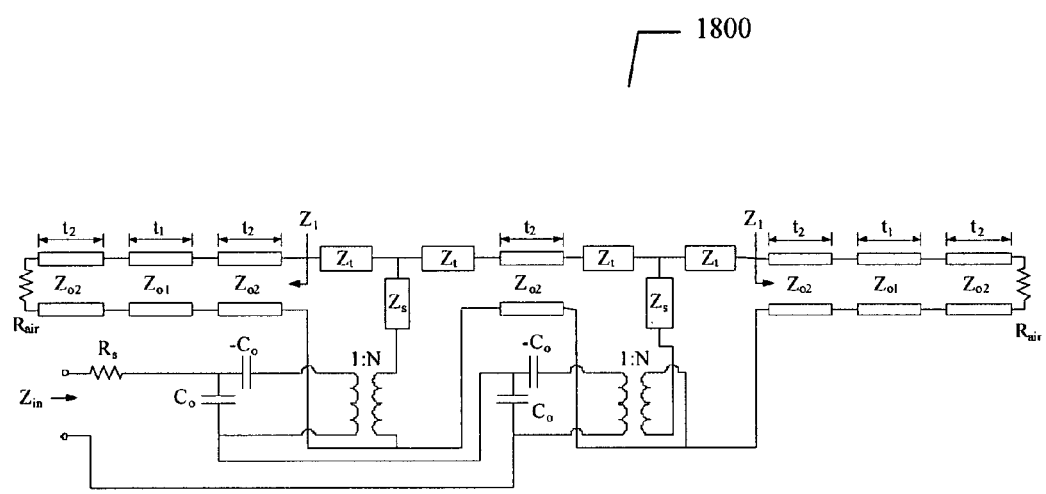
FIG. 18 graphically depicts an acoustic circuit model for the tunable capacitor structure shown in FIG. 3.

Embodiment B shown in FIG. 3 may also be modeled using Mason's model for the acoustically active layers. One such model, shown in FIG. 18 generally as 1800, allows the calculation of electrical impedance and Q. Note that the secondary of the two transformers is wired differently to produce opposite phases of longitudinal movement in the dielectric layers 304 and 306. This is needed because, in FIG. 3, the DC biasing electric fields are oppositely directed across layers 304 and 306. Also in this model is the assumption that the capacitor structure is suspended in air. However, mounting this structure solidly to a substrate will not affect the electrical performance ($Z_{in}$ or Q) in any significant way within the ABG frequency range since the ABG is defined by the tunable dielectric layers and its near neighbors.

Note that the acoustic circuit models shown herein may use simple transmission lines for the acoustically inert layers. Alternatively, such layers may be modeled using passive T-networks with no transformers and it will not change the simulation results or conclusions.

In the aforementioned examples, the ferroelectric layers where depicted to be homogeneous in terms of their acoustic and electrical properties. However, in practice, the ferroelectric layers may be inhomogeneous layers with similar but not identical properties in their sublayers. For instance, ferroelectric layers may exhibit interfacial dead zones whose permittivity may not tune as effectively with applied bias field as the interior of the ferroelectric layer. Such dead zones may have modified acoustic properties as well. Furthermore, a given ferroelectric layer may be fabricated with two or more different process steps, such as sputtering versus MOD (metal organic decomposition), or sputtering in multiple steps to achieve a non-uniform stochiometry of chemical composition along the z axis. Acoustic properties of these ferroelectric sublayers may vary slightly with differences in process steps. However, if necessary, the analysis methods described above may be extended by those of ordinary skill in the art to account for these subtle differences by modeling sublayers with individual ABCD matrices. To put this invention in perspective, as long as the ferroelectric layers are essentially consistent from unit cell to unit cell within the periodic stack, the ABG will be preserved.

In the aforementioned analysis, the electrode layers are considered to be uniform from unit cell to unit cell. However, in practice the electrode layers are deposited in sequence, and the process parameters such as high deposition temperature of the intervening ferroelectric films may alter the material properties (such as mass density) of the lower electrode layers relative to the upper electrode layers. Deviations in material parameters are typically minor perturbations and will not materially affect the periodicity necessary for realization of the ABG.

Although not limited in this respect, important salient features and benefits of some embodiments of the present invention may include:
1. Multiple layers of identical ferroelectric material are used and each layer has the same thickness. The benefit is that a true periodic structure can be obtained w/o any defect layers. Described herein is the term defect layer as a description of a non-uniform feature in an otherwise periodic structure.
2. Outside ferroelectric layers in the capacitor structure are electrically shorted by vias. The benefit is that only the central one or two ferroelectric layer(s) experiences a bias voltage drop. All other ferroelectric layers are acoustically inert. So the acoustically active layers see an approximation to an infinite periodic environment.
3. With composite metal electrodes, a thicker electrode layer may be used than with existing capacitor designs. This reduces the electrode loss and results in a higher device Q.
4. Composite metal electrode 603 may have an inner sublayer 603b which is higher in acoustic impedance than the outer sublayers 603a and 603b. This results in a broader bandwidth and a deeper stopband for the ABG relative to a uniform electrode with the same thickness whose acoustic properties are the same as the outer layers.

While the present invention has been described in terms of what are at present believed to be its preferred embodiments, those skilled in the art will recognize that various modifications to the disclose embodiments can be made without departing from the scope of the invention as defined by the following claims.

What is claimed is:

1. An apparatus, comprising:
   a stack of at least three ferroelectric layers with a top side and bottom side of each of said ferroelectric layers contacting an electrode layer;
   wherein said ferroelectric layers and said electrode layers form a substantially periodic structure in the direction normal to said ferroelectric and electrode layers;
   wherein an acoustic characteristic impedance and thickness of each layer are selected to realize an acoustic bandgap over a desired frequency band; and
   wherein a subset of the electrode and ferroelectric layers are rendered acoustically inert by shorting the electrode layers.

2. The apparatus of claim 1, wherein all ferroelectric layers except for one layer are rendered acoustically inert by electrically shorting the electrodes on opposite sides of a given ferroelectric layer.

3. The apparatus of claim 2, wherein said electrically shorting is accomplished by conductive vias.

4. The apparatus of claim 1, wherein all ferroelectric layers except for two layers are rendered acoustically inert by electrically shorting the electrodes on opposite sides of a given ferroelectric layer.

5. The apparatus of claim 1, wherein said electrodes are metal layers and wherein said metal layers have essentially the same acoustic characteristic impedance and the same thickness.

6. The apparatus of claim 1, wherein said ferroelectric layers have essentially the same acoustic characteristic impedance and the same thickness.

7. The apparatus of claim 1, wherein said electrode layers are each comprised of multiple sublayers.

8. The apparatus of claim 1, further comprising at least one additional passivation layer and at least one final metal interconnect layers used for wire bonding or flip-chip attachment to the next level of assembly.

9. A tunable ferroelectric capacitor, comprising:
   a multilayer one dimensional periodic structure containing multiple unit cells, wherein each unit cell contains a plurality of ferroelectric layers with layers of low and high acoustic characteristic impedance;
   wherein the acoustic impedances of individual layers in said unit cells are selected to produce an acoustic bandgap for a desired frequency band; and
   wherein a subset of electrode layers and the ferroelectric layers are rendered acoustically inert by shorting the electrode layers.

10. The tunable ferroelectric capacitor of claim 9, wherein at least one of said plurality of ferroelectric layers is contacted on both sides by conductive electrode layers.

11. The tunable ferroelectric capacitor of claim 9, wherein all the ferroelectric layers except for one or two layers are rendered acoustically inert.

12. The tunable ferroelectric capacitor of claim 11, wherein said electrically shorting is accomplished by conductive vias.

13. The tunable ferroelectric capacitor of claim 10, wherein said electrodes are metal layers and wherein said metal layers have essentially the same acoustic characteristic impedance and the same thickness.

14. The tunable ferroelectric capacitor of claim 9, wherein said plurality of ferroelectric layers have essentially the same acoustic characteristic impedance and the same thickness.

15. The tunable ferroelectric capacitor of claim 9, wherein said electrode layers are each comprised of multiple sublayers.

16. The tunable ferroelectric capacitor of claim 9, further comprising at least one additional passivation layer and at least one final metal interconnect layer used for wire bonding or flip-chip attachment to the next level of assembly.

* * * * *